Dec. 31, 1968  L. D. BURGESS  3,419,246
TOGGLE VALVE
Filed April 3, 1967
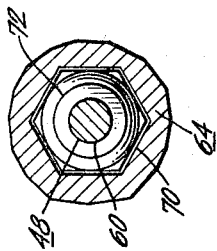
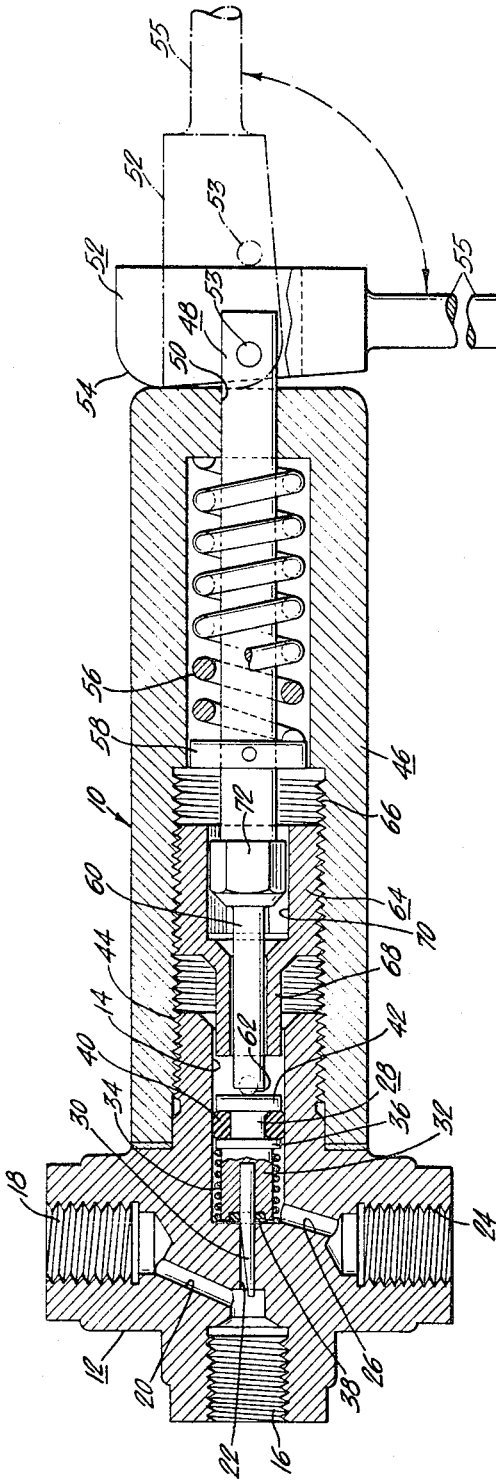
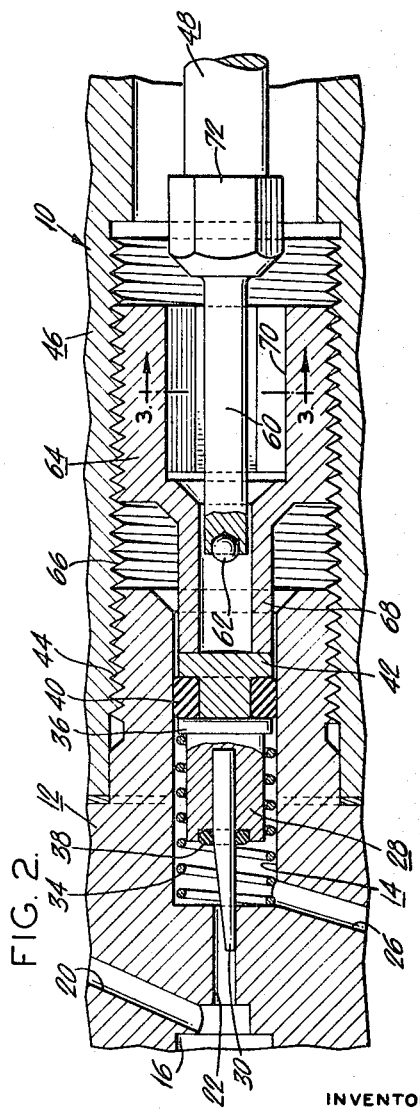
INVENTOR:
LESTER D. BURGESS
BY Howson & Howson
ATTYS.

United States Patent Office 3,419,246
Patented Dec. 31, 1968

3,419,246
TOGGLE VALVE
Lester D. Burgess, Cinnaminson, N.J., assignor to Lif-O-Gen, Inc., Lumberton, N.J., a corporation of Delaware
Filed Apr. 3, 1967, Ser. No. 627,824
6 Claims. (Cl. 251—205)

ABSTRACT OF THE DISCLOSURE

A toggle-actuated valve providing fluid metering control, the valve including a spring-biased valve assembly closable by toggle actuation of the valve stem and including a stop member slidably overlying the stem for selectively limiting outward movement of the valve assembly upon opening of the toggle, the stop member being threadedly mounted in the valve and rotatable with the stem to permit axial adjustment thereof by rotation of the toggle.

The present invention relates generally to fluid control valves of the toggle-actuated type and relates more particularly to a toggle valve which combines a fluid metering mechanism operable by the single toggle control to adjust fluid flow through the valve.

In conventional fluid control arrangements, and especially in the control of gases at precise flow rates, toggle valves are normally employed in series with a separate metering valve to provide a rapid on-off control of the fluid flow while providing means for adjusting the flow rate. Such a side by side arrangement of separate valves is not only expensive to install but requires a substantial amount of space which is frequently at a premium, particularly in laboratory work. Until the development of the present invention, a valve has not been available which, by manipulation of a single control, would permit an instant on-off control of the fluid, and also provide a metering adjustment which may be pre-set and maintained in the pre-set metering position without interfering with the normal on-off toggle operation.

The present mechanism in brief includes a valve assembly axially movable in the bore of a valve body to control flow through the valve and having spring means urging the assembly into the open valve position. An inwardly spring loaded valve stem aligned with the valve body bore and extending thereinto in the closed position of the valve is disposed within and supported by the valve bonnet. The outer end of the stem extends through the bonnet and carries a pivotally mounted toggle by means of which the stem may be moved outwardly to open the valve. A hollow stop member overlying the stem is threadedly engaged with the bonnet and adapted for rotation with the stem while permitting axial sliding movement of the stem therein whereby the stop member may be rotated and hence axially positioned by rotation of the stem. The inner end of the stop member is engaged in the open toggle position by the outer end of the valve assembly to limit the outward movement of the valve assembly and hence govern the flow through the valve.

It is a primary object of the present invention to provide a toggle-type valve which also provides a metering control of the fluid flow through the valve.

A further object of the invention is to provide a valve of the type described wherein both the on-off and metering functions are controlled by manipulation of a single toggle lever.

Another object of the invention is to provide a valve as described of a simple, compact design which may be economically manufactured.

Additional objects and advantages of the invention will be more readily apparent from the following detailed description of an embodiment thereof when taken together with the accompanying drawings in which:

FIG. 1 is a longitudinal sectional view of a valve embodying the present invention showing the valve in the closed position and indicating in broken lines the open position of the toggle control;

FIG. 2 is an enlarged partial view of the valve of FIG. 1 showing the valve in the open position; and FIG. 3 is a sectional view taken along line 3—3 of FIG. 2 showing the hexagonal stem portion slidably engaged within the complementary bore of the stop member.

Referring to the drawings, FIG. 1 shows a valve generally designated 10 embodying the invention and includes a valve body 12 having a bore 14 therein. Inlet ports 16 and 18 in the valve body connected by the passage 20 communicate with the inner end of the bore 14 by means of the coaxial passage 22. An outlet port 24 is connected with the bore by the passage 26 opening through the side wall thereof.

Axially slidable within the bore 14 is the valve assembly 28 which includes a valve needle 30 adapted for axial movement within the passage 22 to meter flow therethrough. The needle 30 is coaxially secured within the cylindrical needle holder 32 around which is disposed the compression spring 34. One end of the spring is seated against the inner end of the bore 14 and the other end bears against the shoulder 36 on the outer end of the needle holder, thus urging the needle holder and needle away from the passage 22. A seal ring 38 is provided around the needle in an annular recess in the needle holder and is adapted to seat against the inner end of the bore in the closed position of the valve assembly. An additional seal ring 40 is provided in the bore 14 adjacent the outer end of the needle holder to prevent fluid flow outwardly through the bore and is held in place by the shouldered seal ring retainer 42 which abuts the outer end of the needle holder.

Threadedly attached to the valve body 12 at 44 is the valve bonnet 46 which extends from the valve body coaxial with the bore 14. A valve stem 48 disposed within the bonnet 46 slidably extends through a bore 50 in the outer end of the bonnet and includes a toggle 52 pivotally mounted on the outer end thereof by the pin 53. The toggle 52 includes cam surface 54 for coaction with the outer end of the bonnet upon pivoting of the toggle by means of the handle 55. A compression spring 56 overlying the stem 48 extends between the inner end wall of the bonnet and the spring collar 58 secured to the stem, the spring thus urging the valve stem inwardly toward the valve assembly 28.

The inner end of the valve stem is characterized by a portion 60 of reduced cross section and includes a ball bearing 62 mounted within the end of the stem such as by swaging. It will be noted from FIG. 1 that in the closed position of the toggle 52 illustrated, the inner end of the stem 48 extends into the bore 14 and the ball 62 bears against the seal ring retainer 42 of the valve assembly 28 to seat the valve assembly against the end wall of the bore 14.

When the toggle 52 is swung into the open position illustrated in broken lines in FIG. 1, the stem 48 will be axially withdrawn against the force of the spring 56 away from the valve assembly 28 into the position shown in FIG. 2. The spring biased valve assembly 28 will start to move outwardly with the withdrawn valve stem 48 but is limited in its outward movement by the adjustable stop member 64, a hollow externally threaded element overlying the stem 48 which is threadedly engaged with the interior threads 66 of the bonnet. The stop member includes an inwardly extending portion 68 of reduced diameter adapted to extend into the bore 14 to provide a stop surface engageable by the valve assembly 28 and specifically the seal ring retainer 42 thereof as illustrated in FIG. 2.

The threaded portion of the stop member as shown in FIG. 3, includes a non-cylindrical enlarged bore 70, in this instance of hexagonal shape, within which an enlarged complementary hexagonal portion 72 of the stem 48 is adapted to slidably fit. By this arrangement, rotation of the stem by means of the toggle handle when the valve is in the closed position of FIG. 1 will rotate and thus selectively axially position the stop member 64, while the axial movement of the stem in response to toggle actuation will have no effect on the stop member position. The provision of the ball bearing 62 on the inner end of the stem prevents rotation of the needle holder during rotation of the stem. A dial or indicator may be provided on the end of the bonnet and a suitable pointer added to the toggle to permit an exact repeatable rotational setting of the valve stem.

For operation, inlet port 16 or 18 or both ports are connected to the source of fluid to be regulated by the valve and the outlet port 24 is connected by suitable conduit means to the desired delivery point. To open the valve from the closed position shown in FIG. 1, the toggle 52 is swung outwardly into the open position shown in broken lines in FIG. 1 to move the stem 48 outwardly against the force of the spring 56. The valve assembly 28 will, on outward movement of the stem, also move outwardly under the influence of the spring 34 until the seal ring retainer 42 thereof contacts the stop member 64. Since the needle 20 is partially withdrawn from the passage 22 on outward movement of the valve assembly, the pressurized fluid flows through the passage 22 into the bore 14 and out through passage 26 into the outlet port 24.

The position of the stop member 64 may, as indicated above, be adjusted when the toggle is in the closed position by rotation of the toggle, thereby rotating the hexagonal portion 72 of the stem while it is within the bore 70 of the stop member 64 to effect a rotation and hence an axial positioning of the stop member by reason of its threaded mounting within the bonnet 46. In the illustrated embodiment, a clockwise rotation of the toggle will move the stop member inwardly to reduce the fluid flow through the valve upon opening of the toggle, while a counterclockwise rotation of the toggle will move the stop member outwardly and increase the flow through the valve in the open position thereof. Once a desired position of the stop member is established, this position can be maintained indefinitely despite the need for repeated opening and closing of the valve. If a dial or indicator is provided on the bonnet, the valve may be reset to predetermined positions to produce predetermined fluid flows assuming the pressure of the fluid supply is held constant.

From the foregoing, it can be understood that the present valve provides an on-off control as well as a metering control of a fluid flow, both of which are effected by manipulation of a single toggle control. The valve thus effectively eliminates the need for an on-off toggle valve and a separate metering valve as conventionally employed, particularly for handling gaseous fluids in precise amounts.

Manifestly, changes in details of construction can be effected by those skilled in the art without departing from the spirit and the scope of the invention as defined in and limited solely by the appended claims.

I claim:

1. A toggle valve including a valve assembly, means biasing said valve assembly toward an open position, a toggle actuated valve stem adapted to close said valve assembly, adjustable stop means for limiting the opening of said valve assembly, and means providing adjustment of said stop means by rotation of said valve stem.

2. A toggle valve comprising a valve body, a bore in said valve body constituting in part a flow passage for fluid passing through said valve, a valve assembly in said bore axially movable therein to meter fluid flow therethrough, spring means urging said valve assembly into the open position, a bonnet extending from said valve body, a valve stem disposed in and extending through said bonnet provided with a toggle control for axial and rotational movement thereof, spring means biasing said stem axially inwardly, an adjustable stop member within said bonnet for limiting the opening of said valve assembly, and means permitting axial adjustment of said stop member by rotation of said stem, said stem in the closed position of said toggle bearing against said valve assembly to close said assembly, said stem in the open toggle position being disengaged from said valve assembly.

3. A toggle valve comprising a valve body, a bore in said valve body, inlet and outlet ports in said valve body communicating through said bore, a valve assembly in said bore axially movable therein to meter fluid flow therethrough, means resiliently urging said valve assembly toward the fully open position, a bonnet extending from said valve body coaxial with said bore, a valve stem disposed in said bonnet for axial and rotational movement therewithin, said stem extending through the outer end of said bonnet, a toggle mounted on the outer end of said stem adapted to provide outwardly axial movement of said stem as well as rotational movement thereof, spring means within said bonnet biasing said stem axially inwardly, an externally threaded hollow stop member within said bonnet overlying said stem engaged with an interiorly threaded portion of said bonnet, means connecting said stem with said stop member to provide rotation of said stop member upon rotation of said stem while permitting axial sliding movement of said stem within said stop member, said stop member in the open position of said stem toggle serving to selectively limit the axial outward movement of said valve assembly, the inner end of said stem bearing against said valve assembly in the closed position of said toggle to close said valve assembly, said stem in the open toggle position being disengaged from said valve assembly.

4. A valve as claimed in claim 3 wherein said means connecting said stem with said stop member comprises a noncylindrical axial bore in said stop member, and a complementary non-cylindrical portion of said stem axially slidable within said stop member bore.

5. A valve as claimed in claim 3 wherein said valve assembly includes a valve needle and needle holder, and a passage in said valve body parallel with said valve body bore connecting said inlet port with said bore adapted to coact with said valve needle to meter fluid flow through the valve.

6. A valve as claimed in claim 3 wherein said spring means biasing said stem axially inwardly provides a substantially greater axial force than said means resiliently urging said valve assembly toward an open position.

References Cited

UNITED STATES PATENTS

| | | | |
|---|---|---|---|
| 1,877,938 | 9/1932 | Moore | 251—285 X |
| 2,368,212 | 1/1945 | Grant | 251—263 X |
| 2,543,205 | 2/1951 | Shoffner | 251—263 X |
| 2,698,160 | 12/1954 | Hansen | 251—263 |
| 3,098,637 | 7/1963 | Baustian | 251—285 X |

M. CARY NELSON, *Primary Examiner.*

ROBERT C. MILLER, *Assistant Examiner.*

U.S. Cl. X.R.

251—263, 285